US012561291B2

(12) United States Patent
Albaiz

(10) Patent No.: US 12,561,291 B2
(45) Date of Patent: Feb. 24, 2026

(54) METHOD OF CLOUD STORAGE FILE SYNCHRONIZATION PRIORITIZATION FOR SELECTED USERS

(71) Applicant: SAUDI ARABIAN OIL COMPANY, Dhahran (SA)

(72) Inventor: Bandar Abdullah Albaiz, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 20 days.

(21) Appl. No.: 18/477,939

(22) Filed: Sep. 29, 2023

(65) Prior Publication Data

US 2025/0110925 A1     Apr. 3, 2025

(51) Int. Cl.
*G06F 16/178*          (2019.01)
*G06F 16/11*           (2019.01)

(52) U.S. Cl.
CPC .......... *G06F 16/178* (2019.01); *G06F 16/122* (2019.01)

(58) Field of Classification Search
CPC ............................. G06F 16/178; G06F 16/122
USPC ........................................................ 707/634
See application file for complete search history.

(56) References Cited

U.S. PATENT DOCUMENTS

| | | | | |
|---|---|---|---|---|
| 10,817,477 | B2 * | 10/2020 | Chan ...................... | G06F 16/168 |
| 2013/0212067 | A1 * | 8/2013 | Piasecki .............. | G06F 16/1787 |
| | | | | 707/620 |
| 2014/0229436 | A1 * | 8/2014 | Wang .................... | G06F 16/178 |
| | | | | 707/622 |
| 2014/0287818 | A1 * | 9/2014 | Chan ........................ | A63F 13/77 |
| | | | | 463/24 |
| 2016/0135023 | A1 * | 5/2016 | Schmit .............. | H04M 3/42272 |
| | | | | 455/417 |
| 2017/0272485 | A1 * | 9/2017 | Gordon .............. | H04N 21/8586 |
| 2023/0232074 | A1 * | 7/2023 | Ramaswamy ....... | H04N 21/472 |
| | | | | 725/29 |

* cited by examiner

*Primary Examiner* — Joshua Bullock
(74) *Attorney, Agent, or Firm* — Osha Bergman Watanabe & Burton LLP

(57)          ABSTRACT

A method is disclosed for processing synchronization requests in a cloud storage system provides a file synchronization request priority policy for specific users. In the method, a synchronization request, which includes a user identification (ID) and a user file reference, is received from a user device. Then, a rule referencing a policy that targets the user ID is retrieved. When the synchronization request is from a priority user of the cloud storage system, a priority policy to the synchronization request is applied.

20 Claims, 4 Drawing Sheets

100

User ID 202

Date 204

Quota 206

Location 208

User ID 210

User Profile
200

Policy ID 222

Priority Level 224

Attributes 226

Policy
220

Rule ID 232

Policy ID 234

Target 236

Rule
230

METHOD OF CLOUD STORAGE FILE SYNCHRONIZATION PRIORITIZATION FOR SELECTED USERS

BACKGROUND

Businesses and individuals are increasingly using cloud storage solutions for several reasons. Cloud storage solutions provide an easy way to store and access files and data from any device at any time. This accessibility allows businesses and individuals to work from anywhere promoting remote and flexible work capabilities while improving productivity. Also, cloud storage solutions are used to protect data from loss due to end user devices malfunctioning. In addition, cloud storage solutions allow businesses and individuals to collaborate and share files with other users.

According to International Data Corporation (IDC) worldwide data is expected to grow from 64.2 zettabytes (ZB) in 2022 to 181 ZB in 2026, at a compound annual growth rate (CAGR) of 23.2%. The growth of data is being driven by the increasing adoption of digital technologies and the increase of connected devices.

However, transmitting large amounts of user data (i.e., by way of uploads and downloads) can cause overhead on the resources of a remote server. In particular, increased overhead may impact performance during partial availability of the remote servers or upon cloud storage service resumption after a scheduled maintenance or unscheduled outage. As a result, users may face slowness or interruptions in file synchronization requests between their devices and the remote server(s).

Accordingly, there exists a need for establishing a file synchronization request priority policy for specific users to mitigate any potential slowness or other interruptions to cloud storage services.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to workflows and methods to process synchronization requests in a cloud storage system. These workflows and methods may establish a file synchronization request priority policy.

In one or more embodiments, a method for processing synchronization requests in a cloud storage system includes receiving, from a user device, a synchronization request comprising a user identification (ID) and a user file reference; retrieving a rule targeting the user ID, wherein the rule references a policy; determining based on the policy whether the synchronization request is from a priority user of the cloud storage system; applying a priority policy to the synchronization request, in response to the synchronization request being from the priority user; and starting synchronization of user files based on the user file reference.

In one or more embodiments, the method further includes retrieving, based on the user ID, a user profile comprising a priority and applying the priority policy based on the priority of the user profile.

In one or more embodiments, in the method, the user data field includes at least one of a creation date, an activity level, a quota, a location, and a priority. In one or more embodiments, the policy includes an attribute: to throttle bandwidth of the user device based on the user data field; to specify a storage volume of the user files based on the user data field; and to allow the priority user to synchronize the user files in an original format. In some embodiments, the policy includes an attribute a time window for the user device to synchronize the user files.

In another aspect, embodiments disclosed herein relate to a system for processing synchronization requests.

In one or more embodiments, a system includes a network, a cloud storage, a user device, and a server. In the system, the service is configured to: receive, from the user device via the network, a synchronization request comprising a user identification (ID) and a user file reference; retrieve a rule targeting the user ID, wherein the rule references a policy; determine based on the policy whether the synchronization request is from a priority user; apply a priority policy to the synchronization request, in response to the synchronization request being from the priority user; and start synchronization of user files from the cloud storage based on the user file reference.

Ine one or more embodiments, in the system, the server is further configured to retrieve, based on the user ID, a user profile comprising a priority and applying the priority policy based on the priority of the user profile.

In one or more embodiments, in the system, the user data field includes at least one of a creation date, an activity level, a quota, a location, and a priority. In one or more embodiments, the policy includes an attribute: to throttle bandwidth of the user device based on the user data field; to specify a storage volume of the user files based on the user data field; and to allow the priority user to synchronize the user files in an original format. In some embodiments, the policy includes an attribute a time window for the user device to synchronize the user files.

In another aspect, embodiments disclosed herein relate to a non-transitory computer readable medium (CRM) storing instructions for performing operation of a cloud storage system.

In one or more embodiments, the operation stored on the non-transitory CRM includes: receiving, from a user device, a synchronization request comprising a user identification (ID) and a user file reference; retrieving a rule targeting the user ID, wherein the rule references a policy; determining based on the policy whether the synchronization request is from a priority user; applying a priority policy to the synchronization request, in response to the synchronization request being from the priority user; and starting synchronization of user files based on the user file reference.

Other aspects and advantages of the claimed subject matter will be apparent from the following description and the appended claims.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
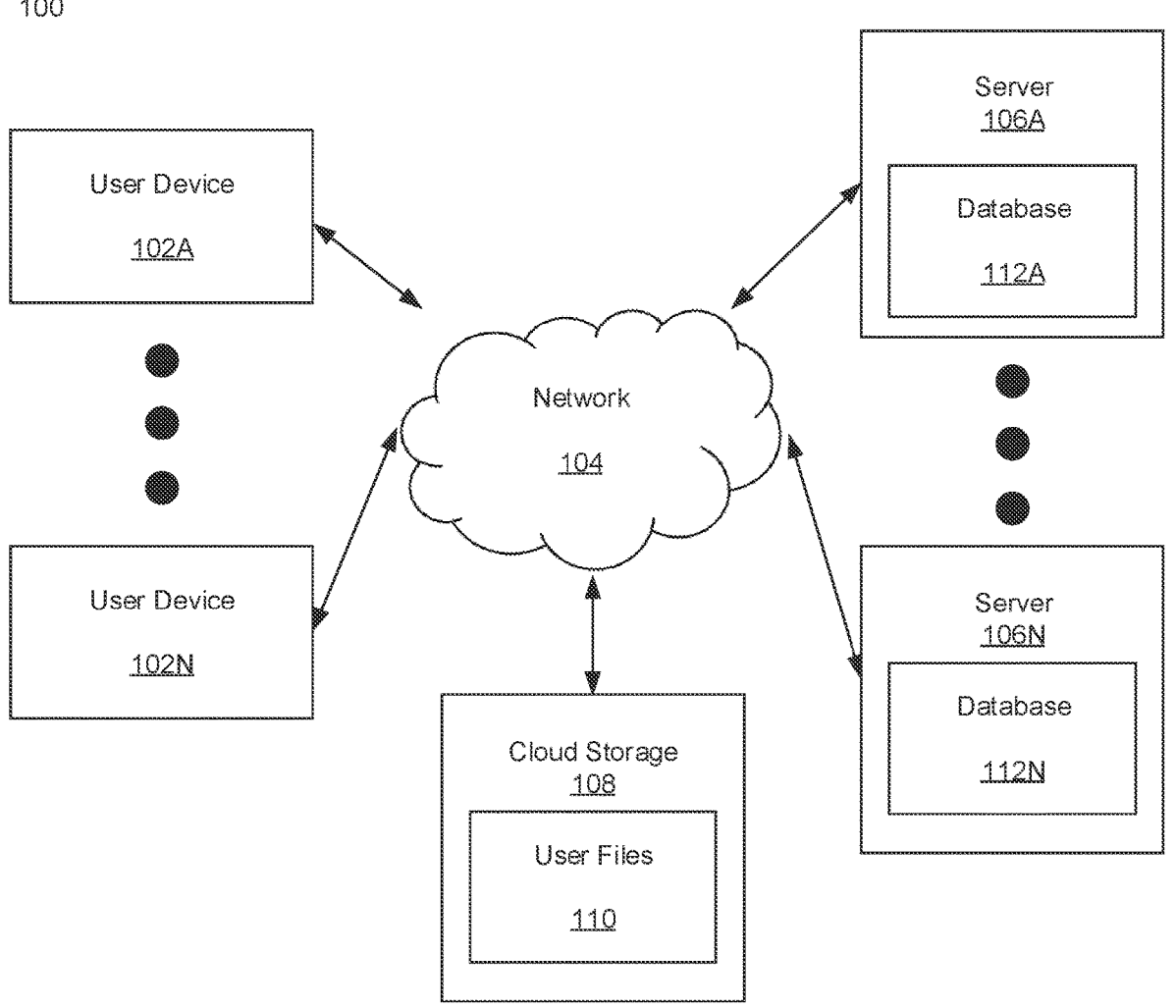
FIG. 1 illustrates a system for cloud storage file synchronization in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-4, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a wellbore" includes reference to one or more of such wellbores.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Cloud storage systems allow for the synchronization of files between user devices and remote servers. For example, synchronization may entail ensuring that files and data remain consistent and up-to-date across all connected devices in real-time. When a user creates a new file or makes changes to an existing file on one device, a cloud storage service may propagate such changes to one or more remote servers hosting the cloud storage system(s) and synchronize the updated file to all other authorized devices (e.g., devices associated with a user profile). In addition, when a user connects a new device to the cloud storage service, the cloud storage service may transmit user's files from the one or more remote servers to the new device. Seamless synchronization may ensure that users can access the most current version of their files from any device thereby facilitating efficient data availability and accessibility.

One or more embodiments disclosed herein relate to establishing a file synchronization request priority policy to mitigate potential slowness or interruptions to one or more users. Embodiments of disclosure may provide at least one of the following advantages: operational continuity; improved user experience for critical or important users; addressing a lack of data synchronization priority policy for users in large-scale cloud storage instances; in a case of a service outage one or more priority users may be prioritized for data restoration such that an organization can ensure business continuity by minimizing downtime and reducing the impact of data loss.

FIG. 1 illustrates a cloud storage system (100) in accordance with one or more embodiments. The cloud storage system (100) includes one or more user devices (102A) through (102N) and one or more servers (106A) through (106N). Further, the cloud storage system includes cloud storage (108) that contains user files (110). The user devices (102A) through (102N), the servers (106A) through (106N), and the cloud storage (108) may be interconnected by way of a network (104). The network (104) may be a wide area network (WAN), a local area network (LAN), and/or the internet. In addition, the network (104) may be comprised of several networks such as an LTE or 5G network connected via the internet to a company LAN. For example, the user device (102A) may utilize a tunnel, such as a Virtual Private Network (VPN) to access the servers (106A) through (106N) and/or cloud storage (108). To utilize the VPN or other security protocol, the user device (102A) may be required to perform authentication or otherwise provide user credentials.

In one or more embodiments, the servers (106A) through (106N) may respectively have databases (112A) through (112N). Databases (112A) through (112N) may store user profile information, policy information, rule information, or other information relating to, for example, domain management. For example, database (112A) may be an Identity and Access Management (IAM) system (e.g., Microsoft Active Directory). Additionally or alternatively, database (112A) may contain authentication or user credential information.

In one or more embodiments, the cloud storage (108) may comprise hard disk drives (HDDs), solid state disk drives (SSDs), or other storage mediums. The storage medium(s) of the cloud storage (108) contain user files (110) that are associated with one or more users. The user files (110) may be stored on a particular storage medium (e.g., SSDs for rapid access) or may be distributed across various storage mediums. For example, user files (110) accessed more frequently may be stored on faster storage media while user files (110) access less frequently may be archived to slower storage media. Those skilled in the art will appreciate that other criteria may apply to the distribution of user files (110) across one or more storage mediums. In addition, cloud storage (108) may be distributed among multiple nodes or multiple locations (e.g., datacenters).

In one or more embodiments, user devices (102A) through (102N) may be a smart phone, a personal computer, a laptop, a tablet, or a workstation. User files (110) may be stored locally on one or more of the user devices (102A) through (102N). For example, user device (102A) may belong to a particular user and the user files (110) associated with the particular user are stored locally on user device (102A). As the particular user creates new files or makes changes to existing files, user files (110) may be synchronized between the user device (102A) and cloud storage (108) via the network (104).

Figure 4:
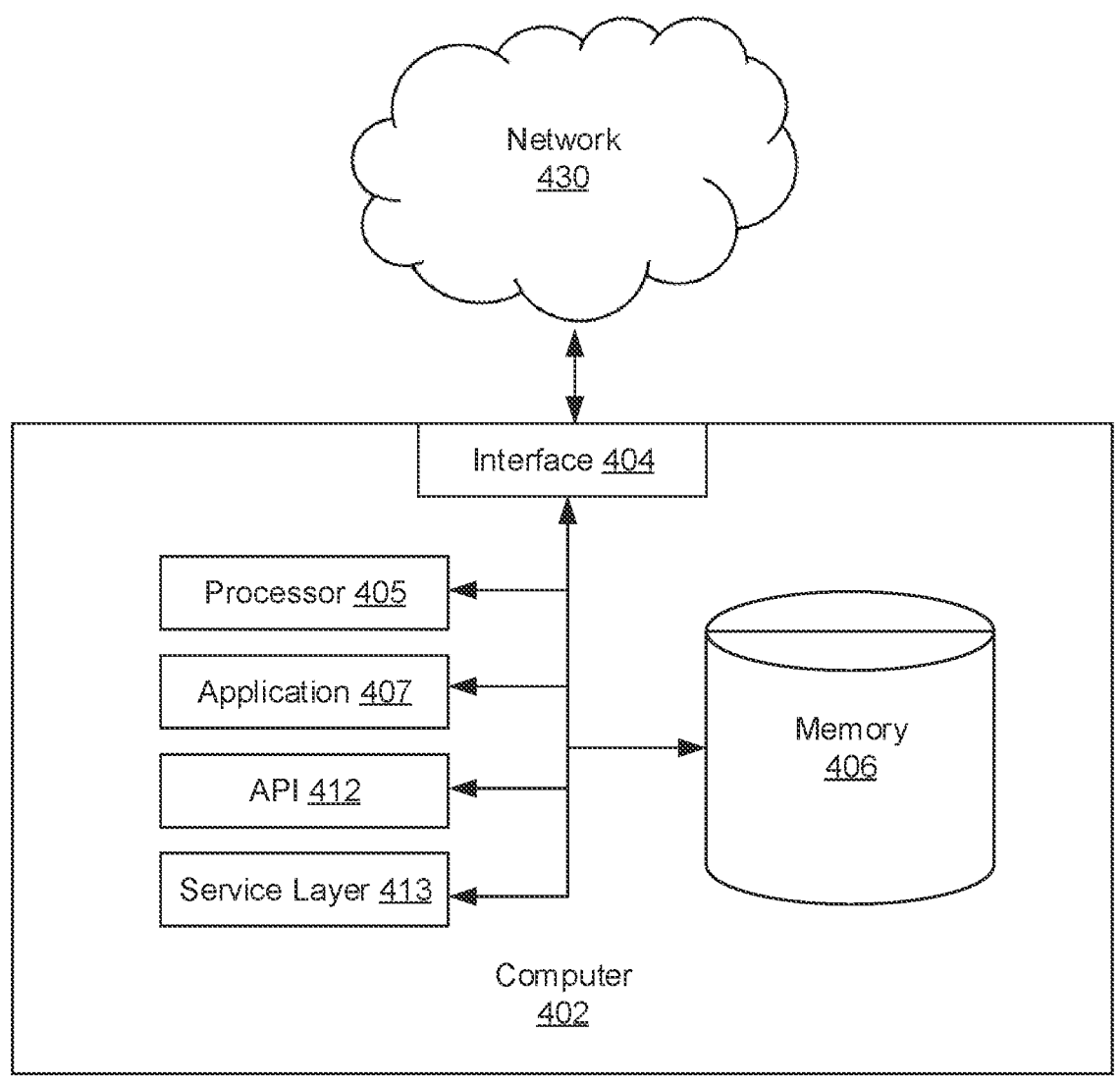
FIG. 4 illustrates a computer system for operating a cloud storage system in accordance with one or more embodiments.

In some embodiments, the devices (102A) through (102N), the servers (106A) through (106N), and the cloud storage (108) may be implemented in one or more computers such as a computer described with reference to FIG. 4.

Figure 2A:
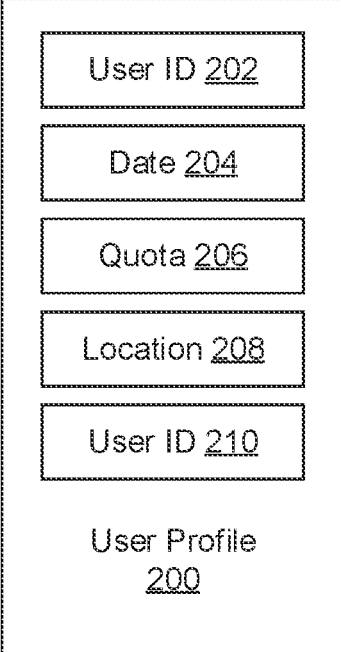
FIG. 2A illustrates a data structure of a user profile in accordance with one or more embodiments.

FIG. 2A illustrates a data structure of a user profile (200) in accordance with one or more embodiments. One or more user profiles (200) may be stored on one or more of servers (106A) through (106N), for example, in one or more of databases (112A) through (112N).

A user profile (200) may include user data fields such as a user ID (202), a date (204), a quota (206), a location (208), and a priority (210). Those skilled in the art will appreciate that a user profile (200) is not limited to such fields.

The User ID (202) may be an identifier that uniquely identifies a particular user such as a Globally Unique Identifier (GUID). The User ID (202) may also contain user credentials such as a username and/or a password. The User ID (202) may also be associated with one or more user groups or subgroups. For example, the User ID (202) may be associated with a particular Active Directory Domain or Group.

The date (204) may be, for example, the date of creation of the user profile or the date that the user was last online. The date (204) may also relate to a date of employment or a date of a most recent payment by the user. The date (204) may be utilized to calculate how long the user profile (200) has been in service or how recently the user profile (200) has been active.

The quota (206) may be an attribute associated with the user profile (200) defining a volume of storage space that the user associated with the user profile (200) is allowed to use. The quota (206) may also comprise multiple storage quotas related to, for example, different storage mediums (i.e., fast versus slow access mediums). Alternatively or additionally, the quota (206) may be a bandwidth threshold after which the user may temporarily or permanently be suspended or throttled. In some embodiments, bandwidth may be throttled up or down.

The location (208) may be the physical location (e.g., a city, a state, a home address, or an office address) of the user associated with the user profile (200). The location (208) may also be an internet protocol address (IP) associated with the user profile (200). The IP address may be associated with a date (204) when the user profile (200) was last active. The location (208) may also be a particular network that user profile (200) accessed.

The priority (210) may be a priority level associated with the user profile (200). The priority (210) may be an index on a scale of varying priority. The priority (210) may also be an employment level or position (e.g., engineer, vice president, administrator, chief executive officer). The priority (210) may also be associated with one or more user groups. In one or more embodiments, the priority (210) may be linked to one or more quotas (206), one or more locations (208), one or more activity dates (204). The priority (210) may be used to determine whether a user is authorized to access full scale or downgraded file formats. The priority (210) may indicate the volume of files stored by the user.

Figure 2B:
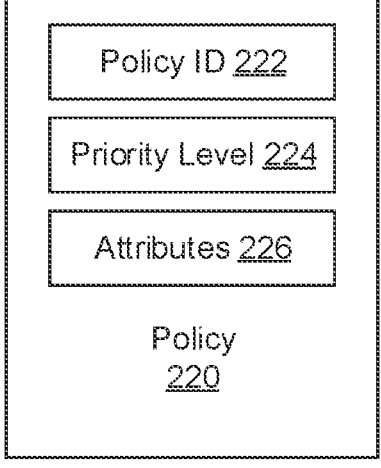
FIG. 2B illustrates a data structure of a policy in accordance with one or more embodiments.

FIG. 2B illustrates a data structure of a policy (220) in accordance with one or more embodiments. One or more user policies (220) may be stored on one or more of servers (106A) through (106N), for example, in one or more of databases (112A) through (112N).

A policy (220) may include fields such as a policy ID (222), a priority level (224), and one or more attributes (226). Those skilled in the art will appreciate that a policy (220) is not limited to such fields.

The policy ID (222) may be an identifier that uniquely identifies a particular policy such as a Globally Unique Identifier (GUID). The policy ID (202) may be associated with one or more users, user groups, or subgroups.

The priority level (224) may identify one or more user priority levels for which the policy (220) applies. Alternatively or additionally, the priority level (224) may be a threshold for which the policy (220) is applicable to a priority index above or below the threshold. The priority level (224) may also be an activity or utilization level based on, for example, one or more user profiles (220).

In one or more embodiments, file synchronization priority level (224) can be determined by the geographical location of the users. Users in specific areas can have a higher priority in file synchronization request than users in other regions. For example, in a scenario where a cloud storage solution is deployed at a private data center (i.e., hosted within a private network of a business) and users are scattered across different geographical locations, some users located at a central location (e.g., near the private data center or the headquarter of a business) may require a higher priority in file synchronization. In this case, file synchronization priority level (224) may be determined and applied based on the location (208). Those skilled in the art will appreciate that, for example, location-based priority may also relate to an enterprise exercising full control over data and/or may be applicable to comply with various regulatory requirements.

In some embodiments, file synchronization priority level and linked policy can be based on the activity levels of users. Users with high activity, such as frequent file uploads, downloads, and modifications, are assigned a higher priority in the file synchronization queue. This ensures that the most active users have timely access to their files and data. In yet other embodiments, the priority level and linked policy can take the form of a single policy tailored to a specific group of users or multiple policies that are applied to corresponding user groups. In some embodiments, priority level can be set based on the user's historical usage of the cloud storage service. For example, users who have been using the service for a longer period of time or who have a higher volume of files stored in the cloud can be given higher priority for synchronization.

The attributes (226) may define the effects of the policy (220). For example, the attributes may include an identifier as to whether the policy (220) is static, dynamic, or a combination of static and dynamic. The attributes (226) may include a trigger or threshold of computational resource utilization. The attributes (226) may define a bandwidth threshold or quota. The attributes (226) may restrict or allow access to differing storage media (e.g., faster or slower storage media). The attributes (226) may define whether a user is authorized to access full scale (i.e., original format) or downgraded file formats. The attributes (226) may define a time window for authorized access or a time window for prioritized access. In other words, the attributes (226) may indicate dynamic changes over time.

Figure 2C:
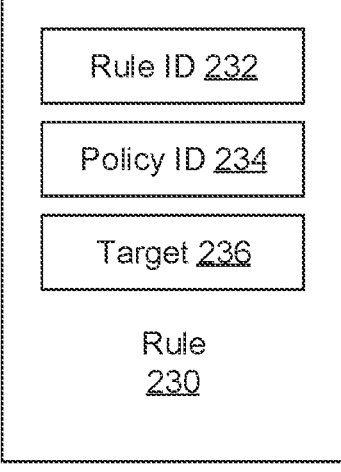
FIG. 2C illustrates a data structure of a rule in accordance with one or more embodiments.

FIG. 2C illustrates a data structure of a rule (230) in accordance with one or more embodiments. One or more rules (230) may be stored on one or more of servers (106A) through (106N), for example, in one or more of databases (112A) through (112N). In one or more embodiments, the rule data structure links the user and the user policy together, whereby the rule indicates what policy applies to what users.

A rule (230) may include fields such as a rule ID (232), a policy ID (234), and one or more targets (236). Those skilled in the art will appreciate that a rule (230) is not limited to such fields.

The rule ID (232) may be an identifier that uniquely identifies a particular rule such as a Globally Unique Identifier (GUID). The policy ID (234) may identify a particular policy to be applied based on the rule (230). The one or more targets (236) may specify one or more users by the user ID (202) or one or more user groups or subgroups.

Figure 3:
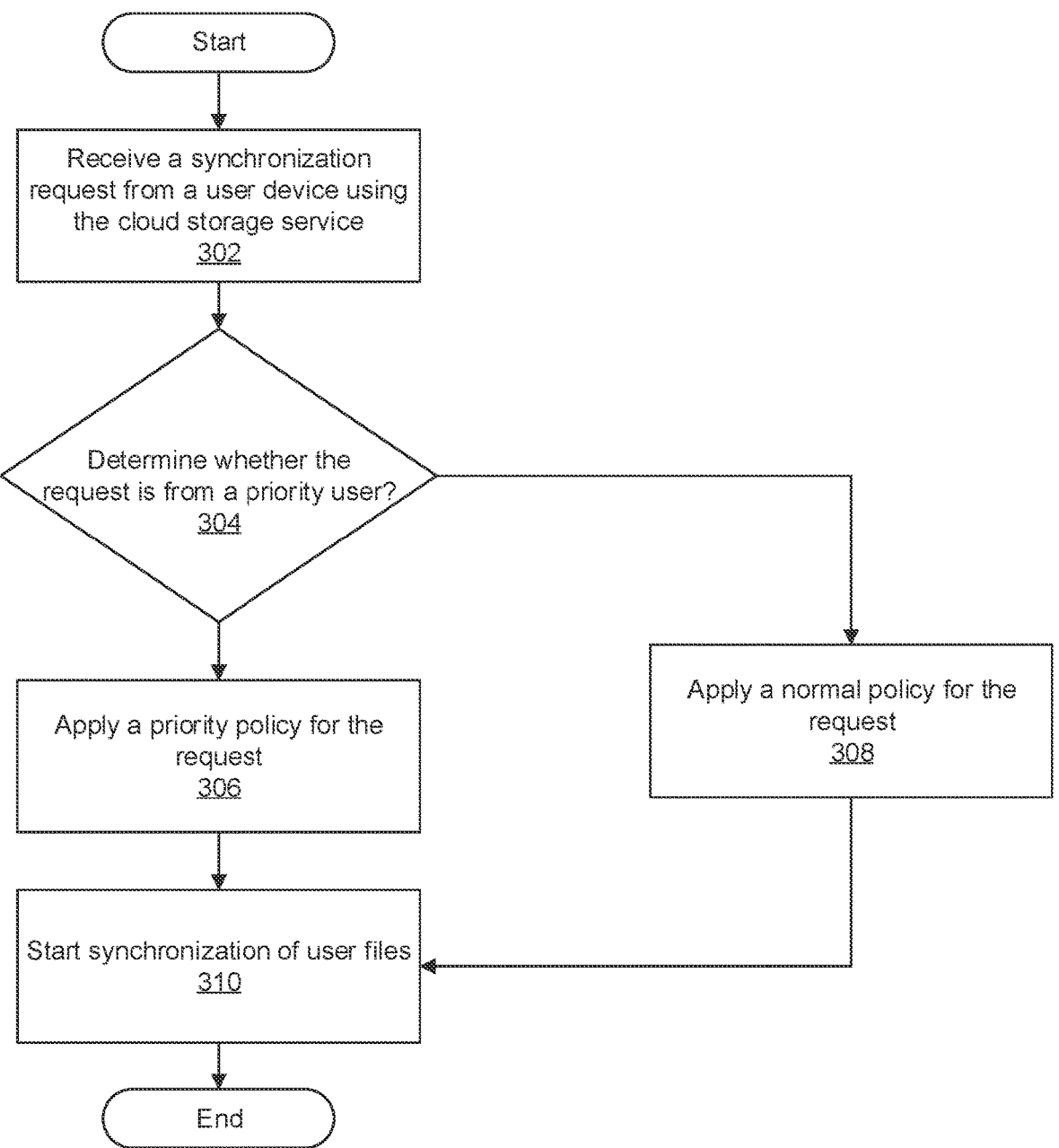
FIG. 3 illustrates a flowchart of a method for prioritizing cloud storage file synchronization for selected users in accordance with one or more embodiments.

FIG. 3 shows a flowchart for an example of a process of synchronizing files according to a synchronization request in accordance with one or more embodiments. More specifically, FIG. 3 depicts a new method to automatically prioritize file synchronization requests from end user devices in cloud storage services. File synchronization requests are fulfilled according to a priority policy based on predefined criteria of users. In one or more embodiments, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3. Steps 302 to 310 shown in FIG. 3 are explained below.

In Step 302, a cloud storage system, such as the cloud storage system (100) of FIG. 1, receives a synchronization request from a user device that includes a user ID and a reference to one or more user files. The synchronization request may be the result of the user connecting a new device to the cloud storage service, or a request to ensure all connected devices have up-to-date information across all user files, for example. In this scenario, the cloud service transmits the files from the remote servers to the new machine. This enables seamless synchronization to ensure users can access the most current version of their files from any device, facilitating efficient data availability and accessibility.

In Step 302, the user device may have previously authenticated with one or more servers or cloud storage or the user device may authenticate during the process of requesting synchronization. For example, the user device may provide a user ID or other tokens required for authentication to one or more servers. The one or more servers may utilize a provided user ID to retrieve the associated user profile and/or any rules targeting the user ID from one or more databases.

In Step 304, the cloud storage system determines whether the request is from a priority user (i.e., a user with a priority level that exceeds a threshold or a user that has a higher priority level than a default or normal priority given to users of the cloud storage service). In other words, the cloud storage system may reference any priority information stored in the user profile and/or any rules targeting the user ID. For example, the user profile may contain priority information relating to a particular user group, the user's employment status, the user's quota, the user's geographical location, or the user's level of activity with the cloud storage service. Additionally or alternatively, the cloud storage system may retrieve one or more policies referenced by one or more retrieved rules that target the user ID. If the determination is made that one or more priority policies are to be applied for the user ID to the synchronization request, then the process proceeds to step 306. If the determination is made that a priority policy does not apply to the user ID then the process proceeds to step 308.

In Step 306, the cloud storage system retrieves one or more attributes from the one or more priority policies to be applied to the synchronization request. For example, the cloud storage system may allocate a particular bandwidth, storage volume, or storage medium for use by the user device associated with the user ID and apply such a setting to the synchronization request, based on user priority. For example, synchronization may occur first for users with priority policies. The cloud storage system may apply multiple attributes to the synchronization request based upon the content of attributes stored in policies identified by one or more rules targeting the user ID.

In Step 308, the cloud storage system applies a normal policy to the synchronization request. In some embodiments, a normal policy may be a default operation of the cloud storage system. In other words, the cloud storage system may process the synchronization request as a standard synchronization request. In some embodiments, the normal policy may also be a de-prioritized policy. In other words, the cloud storage system may retrieve one or more attributes from one or more policies targeted to the user ID by one or more rules. The retrieved attributes may implement restrictions on the behavior of the user device such as limiting storage volume, limiting bandwidth, suspending access during a time window, de-prioritizing the request, or implementing lower quality bandwidth efficient representations of the user files of the synchronization request.

In Step 310, the cloud storage system processes the synchronization request and starts synchronization of user files. In some embodiments, the synchronization request is to upload new or modified files to the cloud storage. In some embodiments, the synchronization request is to download new or modified files from the cloud storage. In some embodiments, the synchronization request may include both upload and download requests of user files. The synchronization request is processed by the cloud storage system by applying the one or more attributes identified in Step 306 or Step 308. Upon completing synchronization of the user files, the process ends. Alternatively, if the cloud storage system is unable to process the synchronization request partially or fully, the process may issue a notification to the user device and/or may return to Step 302.

Those skilled in the art will appreciate that the above Steps 302-310 are described with reference to cloud storage system and that such steps may be performed programmatically. For example, the above Steps 302-310 may be performed individually or by any combination of user devices (102A) through (102N), servers (106A) through (106N), and cloud storage (108). Further, above Steps 302-310 may be performed iteratively over synchronization requests for any number of users or user groups.

Further, one or more embodiments disclosed herein for operating a cloud storage system, for example with reference to FIG. 3, may be implemented on virtually any type of computer system, regardless of the platform being used. For example, the computer system may be one or more mobile devices (e.g., laptop computer, smart phone, personal digital assistant, tablet computer, or other mobile device), desktop computers, servers, blades in a server chassis, or any other type of computer system that includes at least the minimum processing power, memory, and input and output device(s) to perform one or more embodiments of the invention.

An example of the computer system is described with reference to FIG. 4, in accordance with one or more embodiments. FIG. 4 is a block diagram of a computer system used to provide computational functionalities associated with described algorithms, methods, functions, processes, flows, and procedures as described in the instant disclosure, according to an implementation. The illustrated computer (402) in the computer system is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (402) may include a computer that includes an input device, such as a keypad, keyboard, touch screen, or other device that can accept user information, and an output device that conveys information associated with the operation of the computer (402), including digital data, visual, or audio information (or a combination of information), or a GUI.

The computer (402) can serve in a role as a client, network component, a server, a database or other persistency, or any other component (or a combination of roles) of a computer system for performing the subject matter described in the instant disclosure. The illustrated computer (402) is communicably coupled with a network (430). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with an application server, e-mail server, web server, caching server, streaming data server, business intelligence (BI) server, or other server (or a combination of servers).

The computer (402) can receive requests over network (430) from a client application (for example, executing on another computer (402)) and responding to the received requests by processing the said requests in an appropriate software application. In addition, requests may also be sent to the computer (402) from internal users (for example, from a command console or by other appropriate access method), external or third-parties, other automated applications, as well as any other appropriate entities, individuals, systems, or computers.

Each of the components of the computer (402) can communicate using a system bus (403). In some implementations, any or all of the components of the computer (402), both hardware or software (or a combination of hardware and software), may interface with each other or the interface (404) (or a combination of both) over the system bus (403) using an application programming interface (API) (412) or a service layer (413) (or a combination of the API (412) and service layer (413)). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402). The functionality of the computer (402) may be accessible for all service consumers using this service layer (413). Software services, such as those provided by the service layer (413), provide reusable, defined business functionalities through a defined interface. For example, the interface may be software written in JAVA, C++, Python, or other suitable language providing data in extensible markup language (XML) format or other suitable format. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

In one embodiment, the file synchronization priority level and linked policy can be implemented as a software module that is installed on the cloud storage server or a standalone software module that can integrate with cloud storage service via the API (412).

The computer (402) includes an interface (404). Although illustrated as a single interface (404) in FIG. 4, two or more interfaces (404) may be used according to particular needs, desires, or particular implementations of the computer (402). The interface (404) is used by the computer (402) for communicating with other systems in a distributed environment that are connected to the network (430). Generally, the interface (404) includes logic encoded in software or hardware (or a combination of software and hardware) and operable to communicate with the network (430). More specifically, the interface (404) may include software supporting one or more communication protocols associated with communications such that the network (430) or interface's hardware is operable to communicate physical signals within and outside of the illustrated computer (402).

The computer (402) includes at least one computer processor (405). Although illustrated as a single computer processor (405) in FIG. 4, two or more processors may be used according to particular needs, desires, or particular implementations of the computer (402). Generally, the computer processor (405) executes instructions and manipulates data to perform the operations of the computer (402) and any algorithms, methods, functions, processes, flows, and procedures as described in the instant disclosure.

The computer (402) also includes a memory (406) that holds data for the computer (402) or other components (or a combination of both) that can be connected to the network (430). For example, memory (406) can be a database storing data consistent with this disclosure. Although illustrated as a single memory (406) in FIG. 4, two or more memories may be used according to particular needs, desires, or particular implementations of the computer (402) and the described functionality. While memory (406) is illustrated as an integral component of the computer (402), in alternative implementations, memory (406) can be external to the computer (402).

The application (407) is an algorithmic software engine providing functionality according to particular needs, desires, or particular implementations of the computer (402), particularly with respect to functionality described in this disclosure. For example, application (407) can serve as one or more components, modules, applications, etc. Further, although illustrated as a single application (407), the application (407) may be implemented as multiple applications (407) on the computer (402). In addition, although illustrated as integral to the computer (402), in alternative implementations, the application (407) can be external to the computer (402). In one example, the method described with reference to FIG. 4 may be implemented by the application (407).

There may be any number of computers (402) associated with, or external to, a computer system containing computer (402), each computer (402) communicating over network (430). Further, the term "client," "user," and other appropriate terminology may be used interchangeably as appropriate without departing from the scope of this disclosure. Moreover, this disclosure contemplates that many users may use one computer (402), or that one user may use multiple computers (402). Furthermore, in one or more embodiments, the computer (402) is a non-transitory computer readable medium (CRM).

In some embodiments, the computer system 302 is implemented as part of a cloud computing system. For example, a cloud computing system includes one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which are performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

For purposes of this disclosure, any element mentioned in the singular also includes the plural.

Embodiments disclosed herein provide the following advantages. The Idea of file synchronization priority levels and linked policies aims to optimize resource utilization and enhance business continuity and improve user experience for specific users by granting them priority in the synchronization process based on various criteria. The method disclosed herein addresses the challenge of handling large-scale data synchronization requests, especially in a rapidly growing cloud storage market. Also, it can help organizations and businesses in case of disaster recovery scenarios where all users need to retrieve large amount of data from the same remote servers in short period of time.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for processing synchronization requests in a cloud storage system, the method comprising:

receiving, from a user device, a synchronization request comprising a user identification (ID) and a user file reference;

retrieving a rule targeting the user ID, wherein the rule references a policy;

determining based on the policy whether the synchronization request is from a priority user of the cloud storage system;

applying a priority policy to the synchronization request, in response to the synchronization request being from the priority user; and starting synchronization of user files based on the user file reference, wherein the policy comprises a priority level that is determined based on a geographical location of the user device, and wherein in a case where the priority level is determined based on the geographical location, and when the user device is located closer to a central location compared to another user device, the user device is assigned a priority level that is higher than a priority level of the another user device.

2. The method according to claim 1, further comprising:

retrieving, based on the user ID, a user profile comprising a priority and applying the priority policy based on the priority of the user profile.

3. The method according to claim 2, wherein the user profile further comprises a user data field, and wherein the method further applies the priority policy based on the user data field.

4. The method according to claim 3, wherein the user data field comprises at least one of a creation date, an activity level, a quota, a location, and a priority.

5. The method according to claim 4, wherein the policy includes an attribute to throttle bandwidth of the user device based on the user data field.

6. The method according to claim 4, wherein the policy includes an attribute to specify a storage volume of the user files based on the user data field.

7. The method according to claim 4, wherein the policy includes an attribute to allow the priority user to synchronize the user files in an original format.

8. The method according to claim 4, wherein the policy includes as an attribute a time window for the user device to synchronize the user files.

9. A system for processing synchronization requests, the system comprising:

a network;

a cloud storage;

a user device; and a server configured to:

receive, from the user device via the network, a synchronization request comprising a user identification (ID) and a user file reference;

retrieve a rule targeting the user ID, wherein the rule references a policy;

determine based on the policy whether the synchronization request is from a priority user;

apply a priority policy to the synchronization request, in response to the synchronization request being from the priority user; and start synchronization of user files from the cloud storage based on the user file reference, wherein the policy comprises a priority level that is determined based on a geographical location of the user device, and wherein in a case where the priority level is determined based on the geographical location, and when the user device is located closer to a central location compared to another user device, the user device is assigned a priority level that is higher than a priority level of the another user device.

10. The system according to claim 9, wherein the server is further configured to:

retrieve, based on the user ID, a user profile comprising a priority and applying the priority policy based on the priority of the user profile.

11. The system according to claim 10, wherein the user profile further comprises a user data field, and wherein the server further applies the priority policy based on the user data field.

12. The system according to claim 11, wherein the user data field comprises at least one of a creation date, an activity level, a quota, a location, and a priority.

13. The system according to claim 12, wherein the policy includes an attribute to throttle bandwidth of the user device based on the user data field.

14. The system according to claim 12, wherein the policy includes an attribute to specify a storage volume of the user files based on the user data field.

15. The system according to claim 12, wherein the policy includes an attribute to allow the priority user to synchronize the user files in an original format.

16. The system according to claim 12, wherein the policy includes as an attribute a time window for the user device to synchronize the user files.

17. A non-transitory computer readable medium (CRM) storing instructions for performing operation of a cloud storage system, the operation comprising:

receiving, from a user device, a synchronization request comprising a user identification (ID) and a user file reference;

retrieving a rule targeting the user ID, wherein the rule references a policy;

determining based on the policy whether the synchronization request is from a priority user;

applying a priority policy to the synchronization request, in response to the synchronization request being from the priority user; and starting synchronization of user files based on the user file reference, wherein the policy comprises a priority level that is determined based on a geographical location of the user device, and wherein in a case where the priority level is determined based on the geographical location, and when the user device is located closer to a central location compared to another user device, the user device is assigned a priority level that is higher than a priority level of the another user device.

18. The non-transitory CRM according to claim 17, wherein the operation further comprises:

retrieving, based on the user ID, a user profile comprising a priority and applying the priority policy based on the priority of the user profile.

19. The non-transitory CRM according to claim 18, wherein the user profile further comprises a user data field, and wherein the operation further applies the priority policy based on the user data field.

20. The non-transitory CRM according to claim 19, wherein the user data field comprises at least one of a creation date, an activity level, a quota, a location, and a priority.

\* \* \* \* \*